Feb. 17, 1953  A. D. FIELD  2,628,753
PLANT PACKING MACHINE
Filed Oct. 22, 1949  3 Sheets-Sheet 1
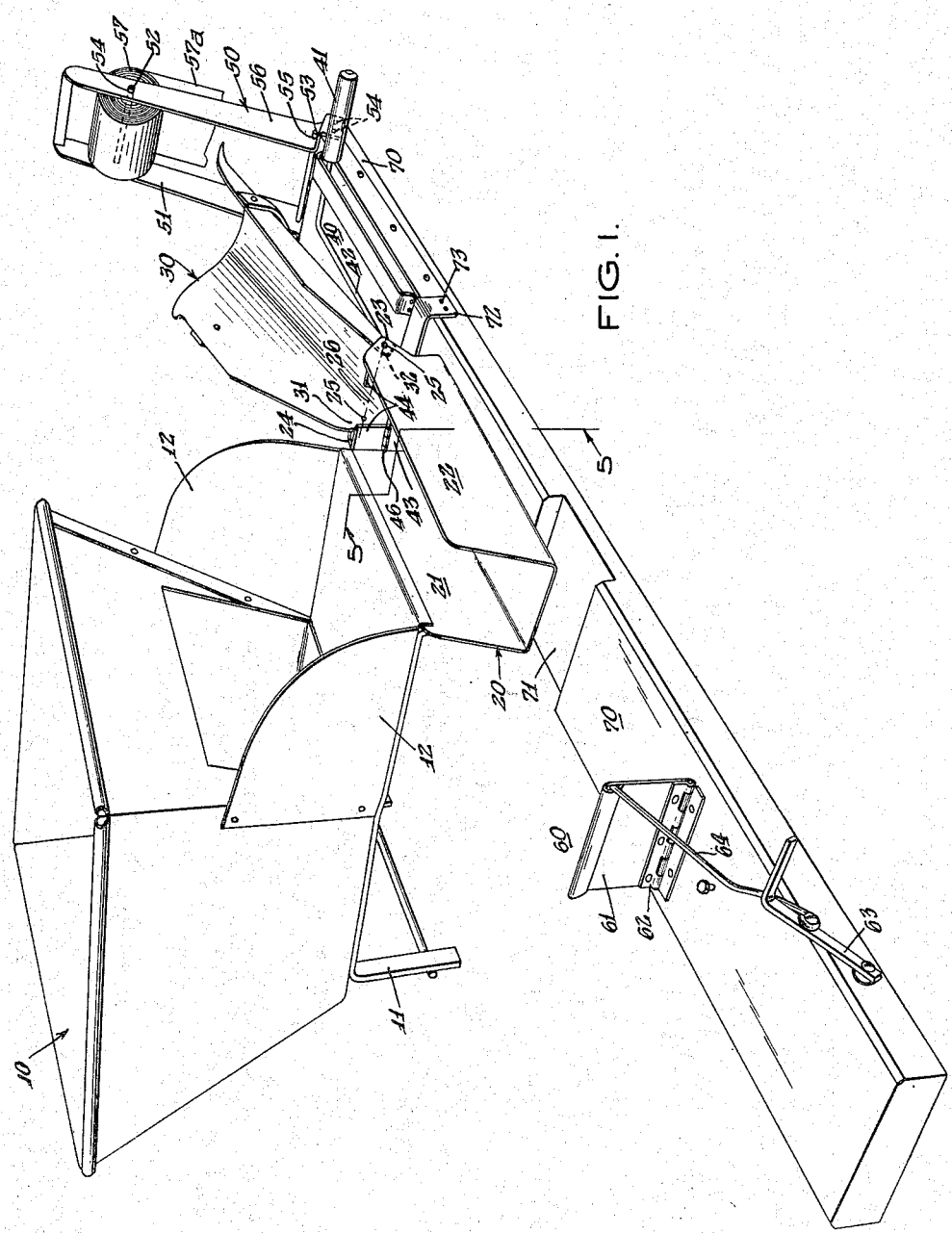
INVENTOR
ALAN D. FIELD
BY
Ostrolenk & Faber
ATTORNEYS

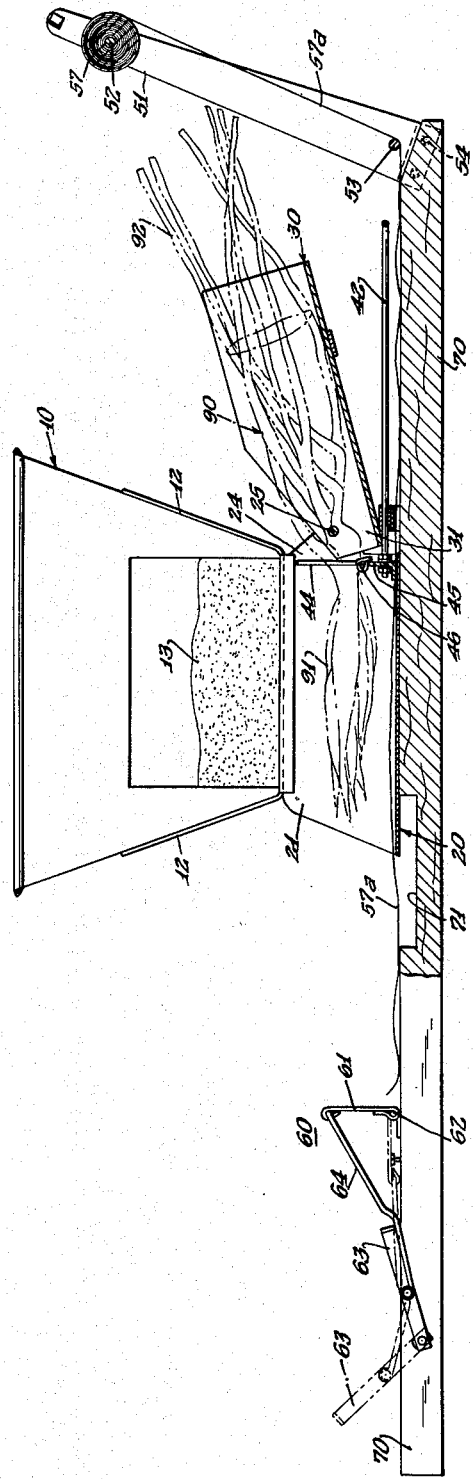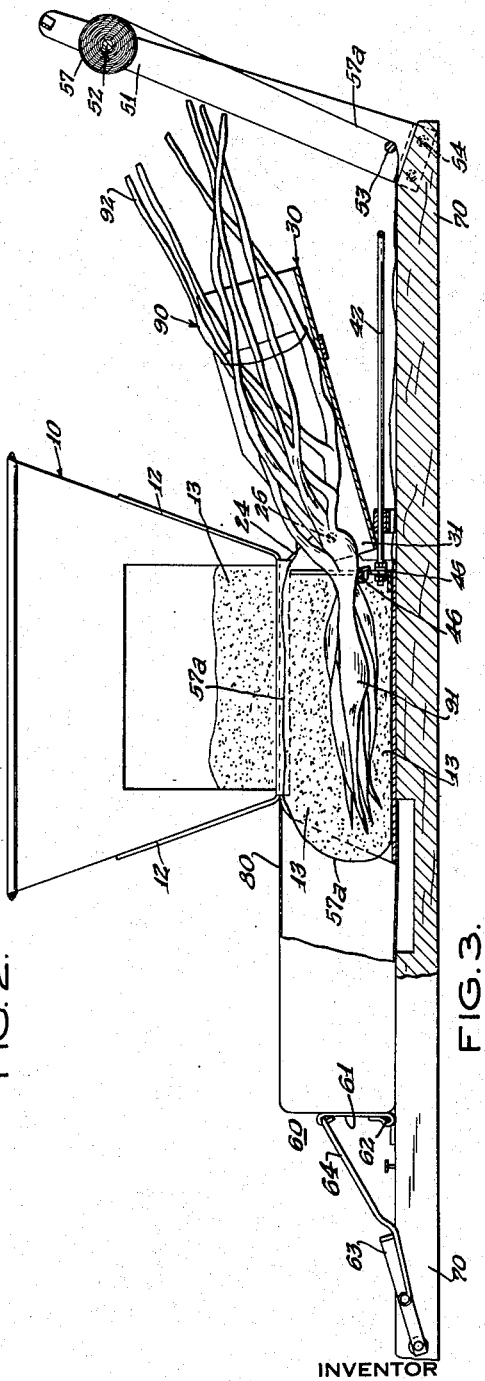

Feb. 17, 1953 A. D. FIELD 2,628,753
PLANT PACKING MACHINE
Filed Oct. 22, 1949 3 Sheets-Sheet 3

INVENTOR
ALAN D. FIELD
BY
Ostrolenk & Faber
ATTORNEYS

Patented Feb. 17, 1953

2,628,753

UNITED STATES PATENT OFFICE 2,628,753

PLANT PACKING MACHINE

Alan D. Field, Eatontown, N. J.

Application October 22, 1949, Serial No. 122,930

4 Claims. (Cl. 226—1)

My invention relates to a plant packing machine and more particularly to a machine to facilitate the packing of various types of plants in individual containers and lends itself to plant packing with the least amount of time, effort and material.

The present method of plant packing is as follows: The plant to be packed is placed in a piece of paper or material large enough to contain its root and a packing material such as soil, peat, humus or other damp materials is added to the root and root wrapping materials. The root wrapping material is then tied at the top so as to include the root and the packing material. The plant, with its roots wrapped, is placed in an outer container such as a bag, box or other container and this package is also tied at the top to complete the process of packing.

Thus prior processes require two separate wrappings, the inner and the outer wrappings, and also require two tying operations of the inner and outer wrappings respectively. Furthermore, it requires two separate steps wherein, after the roots have been packed, the entire plant and root packing must be transferred to the outer package.

The object of my invention is the arrangement of a plant packing machine which accomplishes the same twofold result with however, a saving of material, time and labor.

The packing material is first packed around the root of the plant without tying a root wrapping material. The entire plant and packing material is then inserted into an outer wrapper thus eliminating the several steps outlined above.

One object of my invention is to facilitate the packing of various types of plants into separate containers.

Another object of my invention is to accomplish plant packing with the least amount of time and effort.

Still another object of my invention is to provide a machine which will permit the packing of plants and the saving of packing and wrapping materials.

Other objects of my invention will be evident to those skilled in the art from the following detailed description and drawings in which:

Figure 1 is a front perspective view of the plant packing machine.

Figure 2 is a side illustration partially in section of the machine in position for the first step of plant packing.

Figure 3 is a side front view partially in section of the machine in position of the second step of plant packing.

Figure 4:
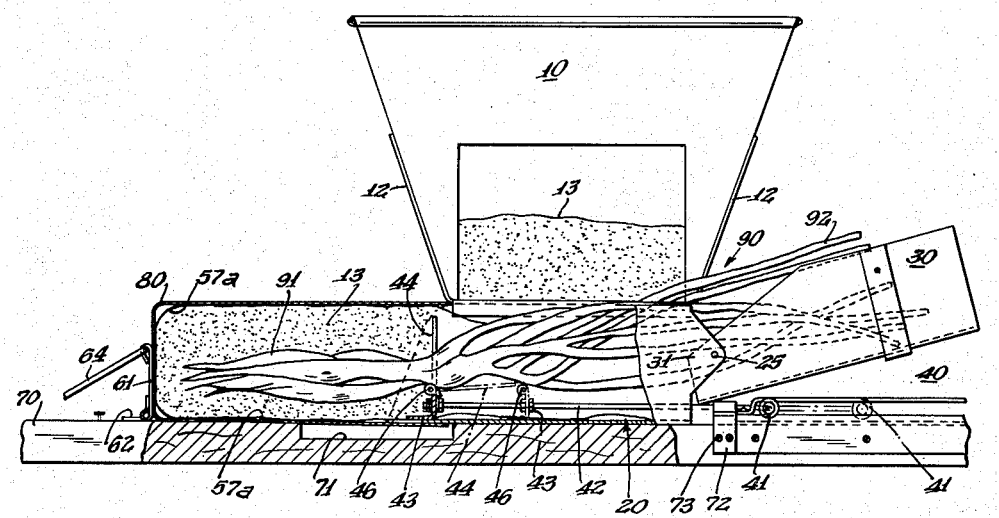
Figure 4 is a side front view of the machine partially in section just prior to the final operation of plant packing.

Referring now to Figure 1, the packing material hopper 10 is mounted on the supports 11 and provided with a guide 12 to insert the packing material such as soil, moss, peat or other moist material into the packing machine. The body of the machine 20 is essentially a U shaped member with two legs, 21 and 22. The guide member 12 fits over the lip of leg 21. Guides 21 and 22 are provided with extensions 23 and 24 respectively.

Plant hopper 30 is provided with extensions 31 and 32. Extensions 31 and 32 are pivotally attached to extensions 23 and 24 respectively by pin 25 so that plant hopper 30 is free to rotate above the axis 26—26. The entire machine is mounted on base board 70 which is provided with a U shaped groove indicated generally at 71. The extended portion 22 of body 20 projects over the U shaped groove 71 to provide a means to receive the plant packing package. A hinged guide 60 is provided to position the package 80. Hinged guide 60 is provided with guide 61 mounted on hinges 62 so that guide 61 is free to rotate to the left as seen in Figures 1 and 2. The position of hinged guide 60 is controlled by levers 63 through the link 64. The lever 63 is pivotally secured to base 70 at pivot 65.

The packing plate assembly 40 is provided with a handle 41 which has longitudinal movements hereinafter described. Handle 41 is connected by L shape rod 42 to packing plate 43. Packing plate 43 is a composite unit formed of plates 44 and 45 connected by hinges 46. Packing plate 43 is provided with a biasing spring (Figure 5) to position plate 44 into vertical alinement and in the plane of plate 45. Body 20 with its legs or extensions 21 and 22 provide a transverse guide for the movement of packing plates 44 and 45.

At the end of base 70 is provided a two armed roll paper holder 50 which is secured to the base 70 by bolts 54. The roll paper holder 50 consists of two extensions 51, 56. Each extension 51, 56 is provided with drilled holes 54 and 55 to receive rods 52 and 53 respectively. Rod 52 is provided to hold a supply of roll paper 57 and rod 53 is provided to act as a guide for this roll paper. Also on plate 70 is mounted an essentially inverted U shaped member 72, connected to the base 70 by means of bolts 73. U shaped member 72 acts as a vertical and transverse guide for the roll paper in a manner similar to rod 53.

The hopper 10 is filled with a suitable packing material 13 such as soil, peat or other moist materials. The roll of paper 57 is unrolled so that it will rotate about the rod 52 and is placed under the guide rod 53, extended under the guide rod 42, and further extended under the inverted U shaped guide 72, and is then rolled under the packing plate 43 and extended to the hinged guide 60. The handle 41 should be pushed to the right position that it will move the packing plate 43 to the position as seen in Figures 1 and 2. The roll paper 57a is then folded so that it will extend back of the packing plate 43.

A package 80, of either square or round cross-sections is then placed with its open end extending around the extension 22. Handle 63 is then moved to the right so that motion can be transmitted through the connecting bar 64 to the hinged guide 60. This permits the positioning of the package 80 and prevents its movement to the left. This is indicated in Figure 2. Paper strip 57a is then lifted up and packing material 13 from the hopper 10 is then transferred to the body 20, until it fills up to half of the height of the guides 21 and 22. Plant 90 is then placed in the plant hopper 30 with its branches resting on hopper 30 and its roots resting in the body 20 on top of the packing material. The portion of the plant between the roots 91 and the branches 92 rests in the U-shaped groove of the packing plate 43. More packing material from the hopper 10 is transferred to the body 20 on top of the root 91 on the plants 90. The plant packing material is placed in the body 20 until the packing material reaches the top guides 21 and 22 and completely around the roots 91. The strip of roll paper 57a is then placed over the packing material as shown in Figure 3.

The handle 41 is then moved to the left transmitting the motion through the L-shaped rod 42 to the packing plate 43. This operation moves the plant, packing material, and paper 57a into the package 80. The completion of this operation is indicated in Figure 4. The handle 41 is then moved to the right so that packing plate 43 is also moved to the right. The upper plate 44 will have its movement interrupted by the branches 90 of the plant. However, this upper plate 44 will be allowed to swing to the left about the hinges 46, and permit removal of the packing plate 43 to the right of the machine as indicated in Figure 1.

A suitable twine 81 (Figure 6) is then wrapped around the upper portion of the package 80 to insure the complete wrappings of the root 91, the paper 57a, the packing material 13 in the package 80. The paper 57a which is in the container is located under and over the roots of its plants. The paper strip 57a is then severed at the top of the package 80 leaving it in a position for repeat operation.

Figures 5, 6:
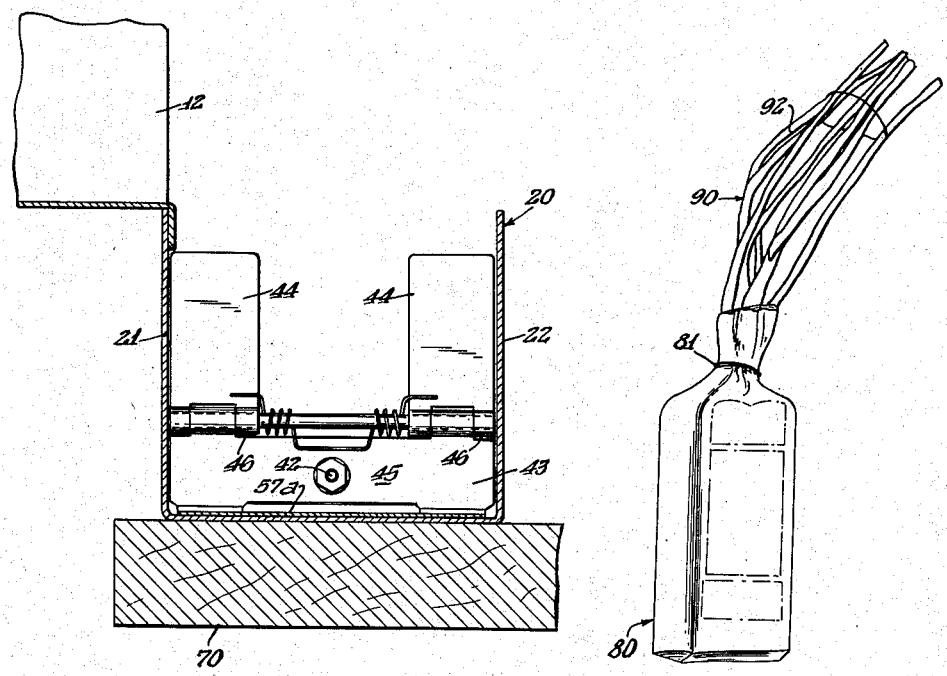
Figure 5 is a partial cross section on line 4—4 of Figure 5 of the machine following the completion of plant packing.
Figure 6 is a view of the packaged plant.

The handle 63 is then rotated to the left permitting the hinged guide 60 to rotate about the hinges 62 and to permit the removal of the package 80 which is now filled with packing material and the plant. A complete package of the packed plant and the position of the guide lever 61 is indicated in Figures 1, 2 and 6.

The operation of my novel machine permits the packaging of plants to have their roots completely surrounded by a moist packing material and placed in an outer suitable container. This is all accomplished in one operation of packaging.

The prior art of using a cloth or paper in which moist packing material was placed and then placing the plant roots on top of the moist material, and putting more moist material on top of the roots, packaging the cloth so that it is tied firmly above the roots and inserting the entire unit in a container, and then again tying the package has been greatly simplified.

The packaging of plants with this plant packing machine eliminates the necessity of two tying operations, eliminates the need for any inner wrapping cloth surrounding the moist packing material and also eliminates the added time and energy required to transfer the packed root to an outer package.

It should be noted that the package into which the plant is packed, could be a container of either a round or square cross-section and may be of such material consisting of either plastic, paper, metal or any other material which lends itself to plant packing.

It should be understood that the invention as herein disclosed is not limited to precise machine and packaging, but on the other hand may be varied in detail and application within the scope of the claims.

In the foregoing I have described my invention solely in connection with illustrative embodiments thereof. Since many variations and modifications of my invention may now be obvious to those skilled in the art, I prefer to be bound not by the specific disclosures herein contained, but only by the appended claims.

I claim:

1. A packing machine comprising a U shaped housing, a base having a U shaped recess and a movable plate assembly; a first end of said U shaped housing extending over said U shaped recess in said base, said U shaped housing acting as a transverse guide for said plate assembly; said plate assembly comprising a lower plate, an upper plate and biasing spring; said lower plate and said upper plate being hinged together said upper plate being biased by means of said biasing spring into vertical alinement in a plane of said lower plate, said upper plate having a portion cut-out of essentially U shaped form, said lower plate being shaped to fit into said U shaped housing.

2. A packing machine comprising a U shaped housing a base having a U shaped recess, a handle guide and a hinged positioning lever; and a movable plate assembly; a first end of said U shaped housing extending over said U shaped recess in said base, said U shaped housing acting as a transverse guide for said plate assembly; said plate assembly comprising a lower plate, an upper plate, a biasing spring and a handle assembly; said lower plate and said upper plate being hinged together said upper plate being biased by means of said biasing spring into vertical alinement in a plane of said lower plate, said upper plate having a portion cut-out of essentially U shaped form, said lower plate being shaped to fit into the said U shaped housing; said plate assembly being longitudinally positioned by means of said handle assembly, said handle guide permitting only longitudinal movement of said handle assembly; said hinged lever being rotatably mounted on said base, to and from said plate assembly.

3. A packing machine comprising a U shaped housing, two hoppers, a base having a U shaped recess, a handle guide, a paper positioning assembly and a hinged positioning lever; and a movable plate assembly; first end of said U shaped housing extending over said U shaped recess in said base, said U shaped housing acting as a transverse guide for said plate assembly; said plate assembly comprising a lower plate, an upper plate, a biasing spring and a handle assembly; said lower plate and said upper plate being hinged together said upper plate being biased by means of said biasing spring into vertical alinement in a plane of said lower plate, said upper plate having a portion cut-out of essentially U shaped form, said lower plate being shaped to fit into the said U shaped housing; said plate assembly being longitudinally positioned by means of said handle assembly, said handle guide permitting only longitudinal movement of said handle assembly; said hinged lever being rotatably mounted on said base, to and from said plate assembly, said paper positioning assembly comprising two arms, a roll paper holding rod rotatably mounted near the top of said arms, a guide rod mounted near the bottom of said arms and; an inverted U shaped guide member mounted on said base one of said hoppers being movably mounted on said U shaped housing and the other of said hoppers being rigidly positioned above said U shaped housing so that the contents of said second mentioned housing can easily pass into said U shaped housing.

4. A packing machine comprising a hopper, a U shaped guide and a U shaped plate assembly, said hopper comprising at least two openings and being positioned above said U shaped guide so that the contents of said hopper can easily pass through one of said openings to said U shaped guide, said U shaped plate assembly being longitudinally movable in said U shaped guide.

ALAN D. FIELD.

REFERENCES CITED

The following references are of record in the file of this patent:

UNITED STATES PATENTS

| Number | Name | Date |
| --- | --- | --- |
| 666,705 | Shaner | Jan. 29, 1901 |
| 1,992,166 | Beauclerk | Feb. 26, 1935 |
| 2,476,475 | Baum | July 19, 1949 |

FOREIGN PATENTS

| Number | Country | Date |
| --- | --- | --- |
| 200,110 | Italy | Aug. 29, 1932 |